US009224046B2

(12) United States Patent
Feris et al.

(10) Patent No.: US 9,224,046 B2
(45) Date of Patent: *Dec. 29, 2015

(54) MULTI-VIEW OBJECT DETECTION USING APPEARANCE MODEL TRANSFER FROM SIMILAR SCENES

(71) Applicant: International Business Machines Corporation, Armonk, NY (US)

(72) Inventors: Rogerio S. Feris, Hartford, CT (US); Sharathchandra U. Pankanti, Darien, CT (US); Behjat Siddiquie, College Park, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/599,616

(22) Filed: Jan. 19, 2015

(65) Prior Publication Data
US 2015/0131861 A1 May 14, 2015

Related U.S. Application Data

(63) Continuation of application No. 13/912,391, filed on Jun. 7, 2013, now Pat. No. 8,983,133, which is a continuation of application No. 13/183,760, filed on Jul. 15, 2011, now Pat. No. 8,498,448.

(51) Int. Cl.
*G06K 9/00* (2006.01)
*G06K 9/62* (2006.01)
*G06T 7/00* (2006.01)
*G06T 7/20* (2006.01)
*H04N 5/225* (2006.01)

(52) U.S. Cl.
CPC ........ *G06K 9/00718* (2013.01); *G06K 9/00771* (2013.01); *G06K 9/00785* (2013.01);

(Continued)

(58) Field of Classification Search
CPC .................................. G06K 9/00; G06T 7/00
USPC .......... 382/103, 107, 236; 348/143, 152, 154, 348/155, 169, 170, 171, 172, 208.1, 352; 701/117, 118, 120, 414, 417, 423; 340/907, 917, 919, 931
See application file for complete search history.

(56) References Cited

U.S. PATENT DOCUMENTS 4,847,772 A 7/1989 Michalopoulos et al.
5,161,107 A * 11/1992 Mayeaux et al. ............. 701/117

(Continued)

OTHER PUBLICATIONS

S. Wender et al, 3D vehicle detection using a laser scanner and a video camera, IET Intelligent Transport Systems, 2008, vol. 2, No. 2, pp. 105-112.

(Continued)

*Primary Examiner* — Abolfazl Tabatabai
(74) *Attorney, Agent, or Firm* — Patrick J. Daugherty; Driggs, Hogg, Daugherty & Del Zoppo Co., LPA

(57) ABSTRACT

View-specific object detectors are learned as a function of scene geometry and object motion patterns. Motion directions are determined for object images extracted from a training dataset and collected from different camera scene viewpoints. The object images are categorized into clusters as a function of similarities of their determined motion directions, the object images in each cluster are acquired from the same camera scene viewpoint. Zenith angles are estimated for object image poses in the clusters relative to a position of a horizon in the cluster camera scene viewpoint, and azimuth angles of the poses as a function of a relation of the determined motion directions of the clustered images to the cluster camera scene viewpoint. Detectors are thus built for recognizing objects in input video, one for each of the clusters, and associated with the estimated zenith angles and azimuth angles of the poses of the respective clusters.

20 Claims, 6 Drawing Sheets

(52) U.S. Cl.
CPC ............ *G06K9/6218* (2013.01); *G06T 7/0042* (2013.01); *G06T 7/2033* (2013.01); *G06T 2207/10016* (2013.01); *G06T 2207/20081* (2013.01)

(56) References Cited

U.S. PATENT DOCUMENTS

| | | | | |
|---|---|---|---|---|
| 7,446,797 B2 * | 11/2008 | Lee | ................ | 348/143 |
| 7,446,979 B2 | 11/2008 | Jayasekara | | |
| 8,498,448 B2 * | 7/2013 | Feris et al. | ............... | 382/103 |
| 2006/0177100 A1 | 8/2006 | Zhu et al. | | |
| 2008/0273752 A1 | 11/2008 | Zhu et al. | | |
| 2010/0054535 A1 | 3/2010 | Brown et al. | | |
| 2010/0278420 A1 | 11/2010 | Shet et al. | | |

OTHER PUBLICATIONS

U.S. Appl. No. 13/912,391, filed Jun. 7, 2013.
Notice of Allowance (Mail Date Oct. 31, 2014) for U.S. Appl. No. 13/912,391, filed Jun. 7, 2013.

* cited by examiner

MULTI-VIEW OBJECT DETECTION USING APPEARANCE MODEL TRANSFER FROM SIMILAR SCENES

BACKGROUND

The present invention relates to using computer vision systems, methods or algorithms to search video image data for objects as a function of scene geometry and object motion direction attributes.

Object detection and recognition presents a number of problems in computer vision applications. For example, detecting and distinguishing individuals, vehicles and other objects in video data acquired from views of uncontrolled environments (urban streets, etc.) may be problematic due to inconsistent, poor or variable scene illumination conditions, environments that vary over time (e.g. sunlight, shadows, reflections, rain, snow, night-time street illumination, etc.). The video data may also be acquired from low resolution cameras, and objects may partially occlude each other as they move through a scene relative to a camera viewpoint, particularly in high density situations. Images acquired may also be crowded with multiple objects, comprise fast moving objects, and exhibit high object occurrence and motion frequencies, image clutter, variable object lighting and resolutions within a common scene, as well as distracting competing visual information. All of these situations present a challenge to both human and automated processes for object tracking and recognition in video data.

BRIEF SUMMARY

In one embodiment of the present invention, a method for learning a plurality of view-specific object detectors as a function of scene geometry and object motion patterns includes a processing unit determining motion directions for object images extracted from a source training video dataset input that has size and motion dimension values meeting an expected criterion of an object of interest, and wherein the object images are collected from different camera scene viewpoints. The object images are categorized into clusters as a function of similarities of their determined motion directions and camera viewpoints, wherein the object images in each cluster are acquired from the same camera scene viewpoint and have similar motion direction. The method further estimates zenith angles for poses of the object images in the clusters based on the position of the horizon in the camera scene viewpoint (the viewpoint from which the images are acquired) of each cluster, and azimuth angles of the poses as a function of the determined motion directions of the objects in the viewpoint. Detectors are thus built for recognizing objects in input video, one for each of the clusters, and associated with the estimated zenith angles and azimuth angles of the poses of the respective clusters.

In another embodiment, a system has a processing unit, computer readable memory and a computer readable storage medium device with program instructions, wherein the processing unit, when executing the stored program instructions, determines motion directions for object images extracted from a source training video dataset input that has size and motion dimension values meeting an expected criterion of an object of interest, and wherein the object images are collected from different camera scene viewpoints. The object images are categorized into clusters as a function of similarities of their determined motion directions and camera viewpoints, wherein the object images in each cluster are acquired from the same camera scene viewpoint and have similar motion direction. Zenith angles are estimated for poses of the object images in the clusters based on the position of the horizon in the camera scene viewpoint (the viewpoint from which the images are acquired) of each cluster, and azimuth angles of the poses are estimated as a function of the determined motion directions of the objects in the viewpoint. Detectors are thus built for recognizing objects in input videos, one for each of the clusters, and associated with the estimated zenith angles and azimuth angles of the poses of the respective clusters.

In another embodiment, an article of manufacture has a computer readable storage medium device with computer readable program code embodied therewith, the computer readable program code comprising instructions that, when executed by a computer processor, cause the computer processor to determine motion directions for object images extracted from a source training video dataset input that have size and motion dimension values meeting an expected criterion of an object of interest, and wherein the object images are collected from different camera scene viewpoints. The object images are categorized into clusters as a function of similarities of their determined motion directions and camera viewpoints, wherein the object images in each cluster are acquired from the same camera scene viewpoint and have similar motion direction. Zenith angles are estimated for poses of the object images in the clusters based on the position of the horizon in the camera scene viewpoint (the viewpoint from which the images are acquired) of each cluster, and azimuth angles of the poses are estimated as a function of the determined motion directions of the objects in the viewpoint. Detectors are thus built for recognizing objects in input videos, one for each of the clusters, and associated with the estimated zenith angles and azimuth angles of the poses of the respective clusters.

In another embodiment, a method for providing a service for learning a plurality of view-specific object detectors as a function of scene geometry and object motion patterns includes providing one or more articles, including a motion direction determiner that determines motion directions for object images extracted from a source training video dataset input that have size and motion dimension values meeting an expected criterion of an object of interest, and wherein the object images are collected from different camera scene viewpoints. An object classifier categorizes the object images into clusters as a function of similarities of their determined motion directions and camera viewpoints, wherein the object images in each cluster are acquired from the same camera scene viewpoint and have similar motion direction. A pose parameterizer estimates zenith angles for poses of the object images in the clusters based on the position of the horizon in the camera scene viewpoint (the viewpoint from which the images are acquired) of each cluster, and azimuth angles of the poses are estimated as a function of the determined motion directions of the objects in the viewpoint. Additionally, an object detector modeler builds detectors for recognizing objects in input video, one for each of the clusters and associated with the estimated zenith angles and azimuth angles of the poses of the respective clusters.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
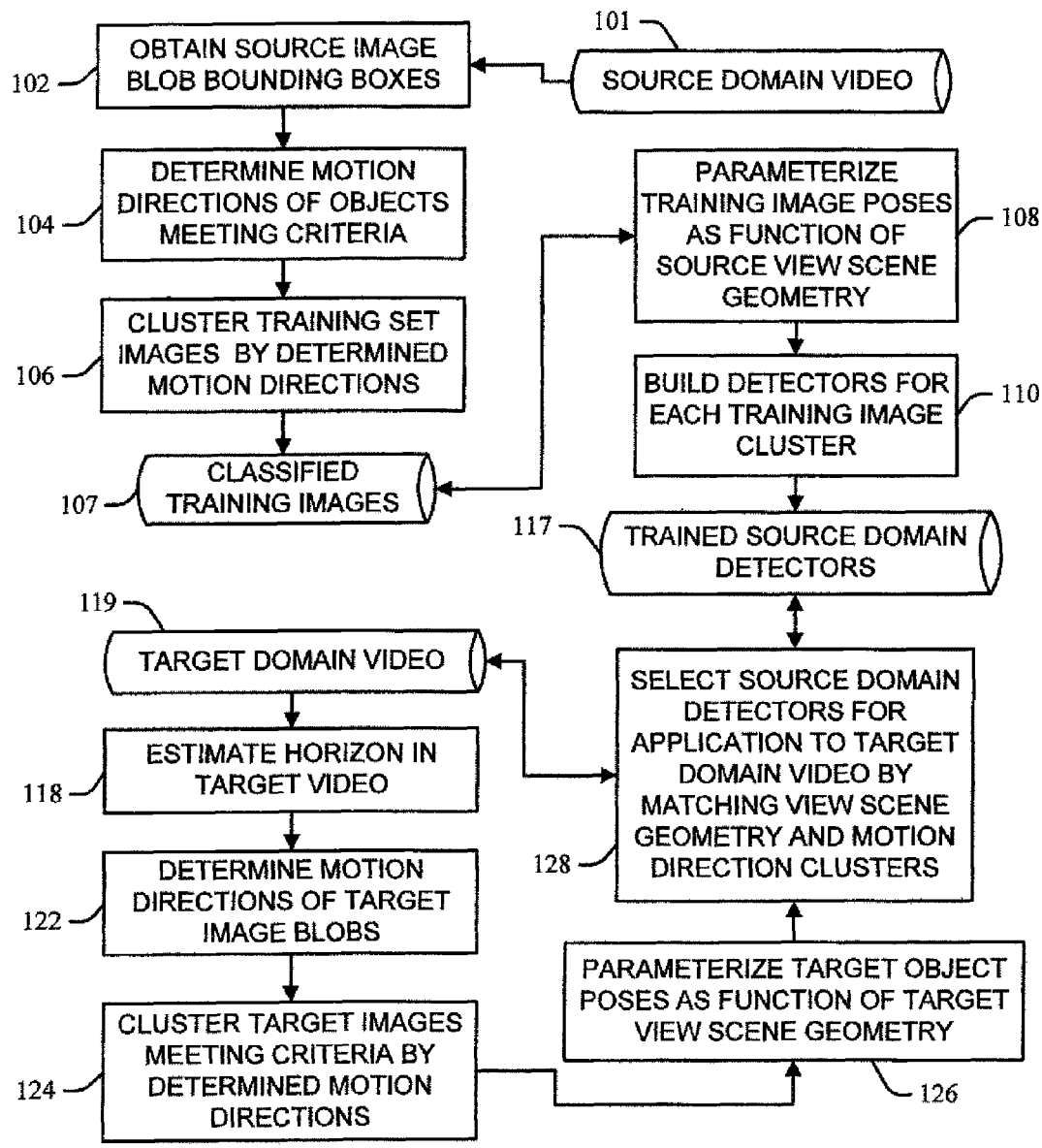
FIG. 1 is a flow chart illustration of an embodiment of a method or system for learning and applying a plurality of view-specific object detectors to object images as a function of scene geometry and object motion patterns.

The drawings are not necessarily to scale. The drawings are merely schematic representations, not intended to portray specific parameters of the invention. The drawings are intended to depict only typical embodiments of the invention and, therefore, should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a method, process or system for learning and applying a plurality of view-specific object detectors to object images as a function of scene geometry and object motion patterns. At 102 a processing unit utilizes a background subtraction process to obtain the bounding boxes of foreground blobs of images of each of plurality of objects of interest within video frames of a training video dataset (source domain) 101. At 104 the motion direction of each extracted foreground object blob is determined using an optical flow process, and at 106 a plurality of training images of objects of interest 107 that each have size and motion dimension values that meet an expected criterion of an object of interest are extracted using a rule-based classifier. More particularly, the process at 102-104-106 collects a large number of classified training images 107 objects that have the size and motion attributes of an object category of predetermined interest (for example, having the size and motion dimension values, or within value ranges of a vehicle when the object of interest is an automobile), in a variety of poses and illumination conditions, yet while requiring minimal supervision.

In some embodiments, a range of acceptable values of size and motion-direction are manually specified at 106 for each camera view in the training dataset, wherein accumulated false positives may be manually removed. Generally, a robust collection of classified training data images 107 is achieved by collecting images from each of a plurality of different camera viewpoints, thus from different cameras, or from multiple different viewpoints of cameras (for example, that change position, zoom settings, etc, to acquire different viewpoints). The training images 107 may also be acquired from source images 101 taken at different variations of scene illumination, for example at different times of day for scenes under natural, ambient light illumination containing variations in the direction and amount of sunlight, resulting reflections and shadows from buildings, through different weather conditions, etc. The images 101/107 may also vary in levels of object density and movement, for example traffic camera images of vehicles taken over varying amounts of traffic.

Classifying the training images at 106 as a function of the determined motion direction of each foreground blob comprises categorizing the object images into sets of clusters for each of the plurality of different camera viewpoints used to acquire the training images as a function of scene geometry of the respective camera viewpoints. This clustering leads to categorization of the training images into a two level hierarchy: (i) a first level of categorization is according to the camera viewpoint and (ii) a second level dependent on the first level and based on the motion-direction within each camera viewpoint, wherein the video data input images 101 from each camera viewpoint comprise images of objects of interest in distinct poses that result from the determined motion direction.

FIGS. 2 through 8 illustrate one embodiment wherein the objects of interest are vehicles, and the source domain training dataset 101 comprises video of urban street scenes taken from a variety of different cameras and viewpoints. However, the present embodiments are provided for illustration, and are not to be construed as limiting implementations of the present invention. Embodiments of the present invention may be practiced with respect to a variety of moving objects and source video where objects are amenable to pose classification as a function of determining their direction of movement. For example, it may be usually inferred that humans will be oriented with the front of their bodies or faces aligned normal to and facing the direction of their pedestrian movements, and thus other embodiments of the present invention may include implementations adapted to track and determine human pedestrian object images acquired in ingress or egress passageways. Other illustrative but not exhaustive examples include implementations adapted to track and determine the movement of animals or other fauna moving along paths of travel; train cars moving along a rail track; manufactured goods, agricultural produce or mining articles moving through a processing system; and still other implementations will be apparent to one skilled in the art.

In one example of the present embodiment adapted for vehicle object detection, a classified training dataset 107 is created at 102/104/106 that comprises about 220,000 images of vehicles acquired from large urban streets with high traffic densities and volumes in a variety of poses and illumination conditions. The clustering at 106 generally results in one or more clusters functioning as leaf nodes of the two-level hierarchy for each camera viewpoint. For example, a single view of a two-way street will generally have at least two clusters, including one for each of the two opposing directions of travel exhibited by the two-way traffic, while some viewpoints of a one-way street may have only one cluster since all objects are moving in the same direction. Still other views may have more than two clusters, for example a view of an intersection of two, two-way streets may have at least four directional clusters. Thus, the training set 107 provides a diverse collection of vehicles in different poses and taken from different camera viewpoints.

At 108 the poses of the objects within each cluster are parameterized as a function of scene geometry, namely as a function of their zenith (φ) and the azimuth angles (θ) with respect to the scene geometry of their respective camera viewpoints. The zenith angles are estimated based on a position of the horizon in the viewpoint, and the azimuth angles are approximated by the motion direction of vehicles with respect to the camera. The viewpoint horizon may be specified (for example, through a manual calibration process) or it may be determined from features extracted from the scene image.

Figure 2:
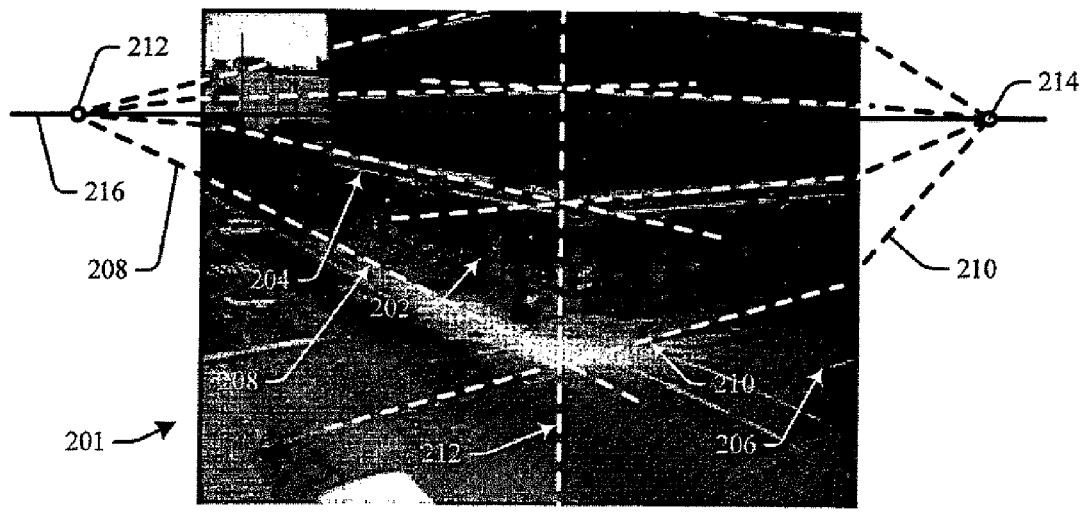
FIG. 2 is a diagrammatic illustration of an urban street intersection scene according to embodiments of the present invention.

In one embodiment, the position of the horizon in each camera view is estimated at 108 by utilizing structures in the images that have an inherent geometric relationship to the image horizon inferred from their real-world, three-dimensional geometry. For example, FIG. 2 illustrates an urban street intersection scene 201. Analysis of the scene (for example, through automated geometric image parsing approaches) identifies a plurality of structures in the scene image that are generally expected to have parallel alignments in the real world represented by the scene 201, such as curbs 202, window ledges 204, lane markers 206, etc., respectively, wherein each is generally parallel to the alignments of others 202/204/206 in the real world. The determined horizontally aligned features 202/204/206 may be used to define at least two (in general multiple) sets of parallel lines 208 and 210, wherein the lines 208 are parallel to each other and aligned with those horizontal structures 202/204/206 to the left of a visual center 212 of the image 201, and the lines 210 are parallel to each other and aligned with those horizontal structures 202/204/206 to the right of the visual center 212 of the image 201. In the camera view perspective of the scene 201 the parallel lines 208 and 210 defined by (or correlated with) these various horizontal structures 202/204/206 intersect at different vanishing points 212 and 214, respectively, and wherein a horizon line 216 is determined as a line passing through the vanishing points 212 and 214.

Figure 3:
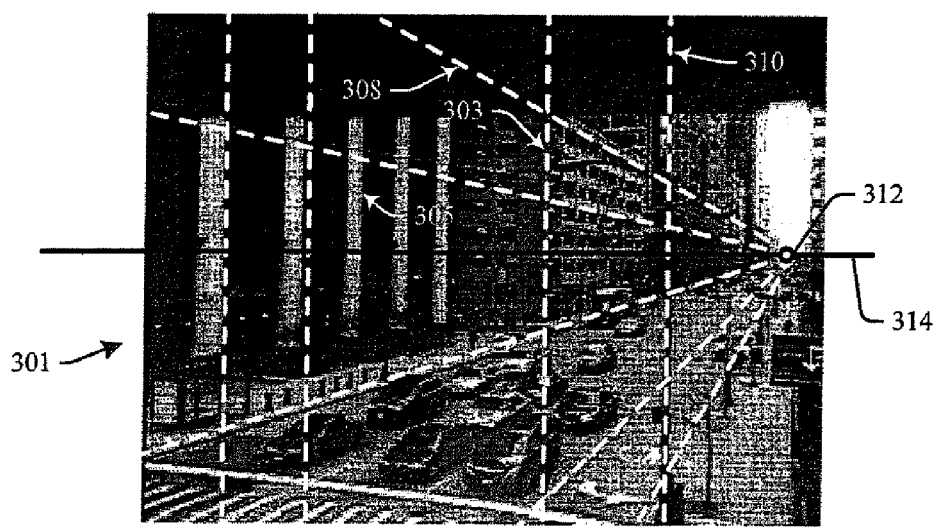
FIG. 3 is a diagrammatic illustration of another urban street scene according to embodiments of the present invention.

FIG. 3 illustrates another urban street scene 301, wherein geometric analysis of the scene identifies a set of structures (curbs, window ledges, lane markers, etc.) that are generally parallel to each other, and which may used to define (or correlate with) a set of parallel lines 308 that through the perspective of the camera viewpoint converge into the horizon at a single vanishing point 312. Geometric analysis also identifies another set of structures in the scene image 301, such as building edges 303, columns 305, etc., which happen to be vertical, and thus normal to the horizontal structures and a horizontal horizon representative of the real world represented by the scene 301. The vertical structures 303/305, etc. are used to define (or correlate with) a set of parallel vertical lines 310. In this example, the horizon line 314 may be estimated at 108 as a line passing through the single vanishing point 312 and normal to the vertical lines 310.

Figure 4:
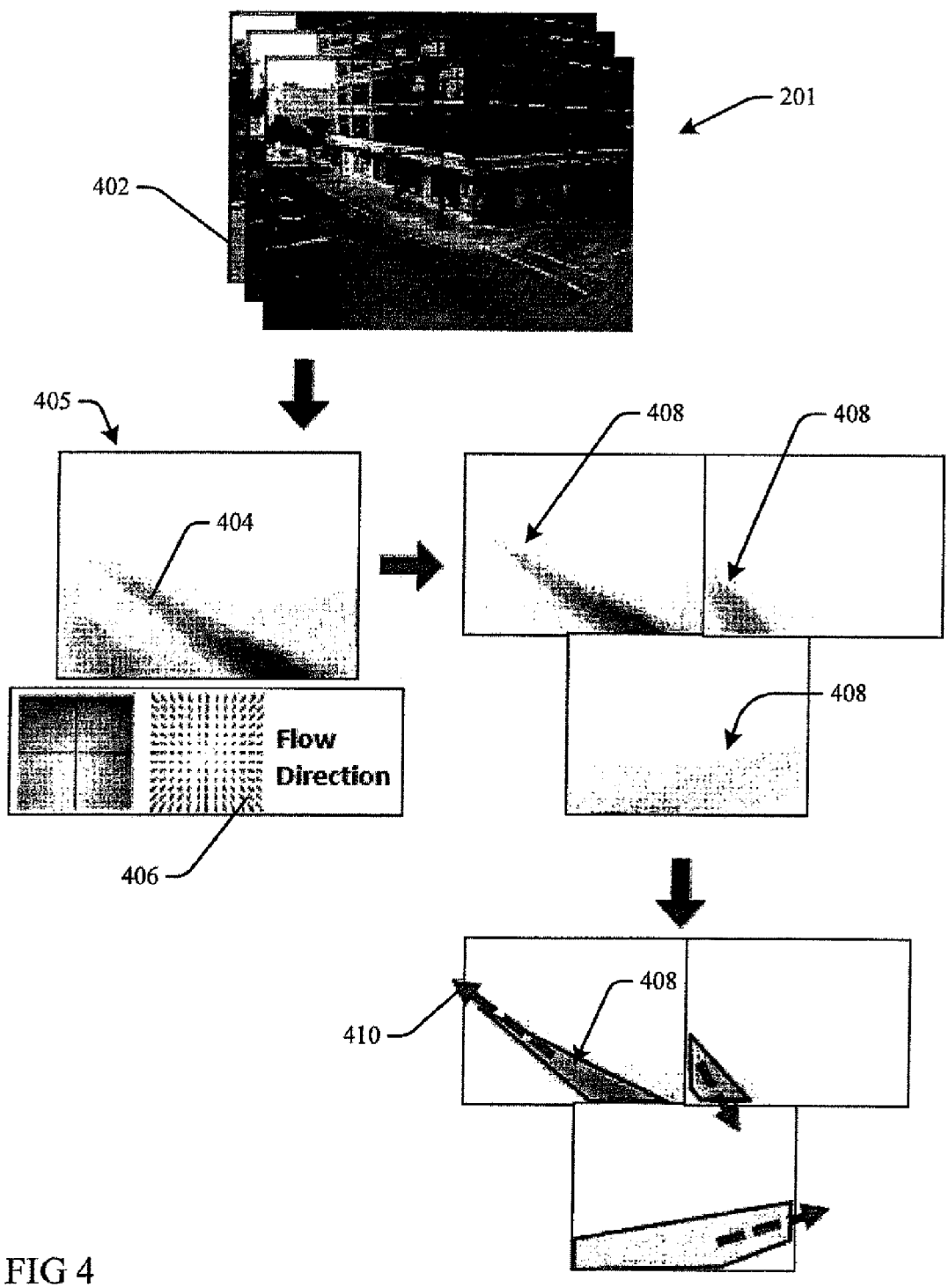
FIG. 4 is a diagrammatic illustration of an optical flow analysis of an image scene according to embodiments of the present invention.

FIG. 4 illustrates an optical flow analysis of an image scene according to embodiments of the present invention. Video clip samples 402 of the camera scene 201 (FIG. 2) are obtained that are sufficient in number for capturing the regular motion patterns that occur within the scene, wherein a clustering based method is employed to discover motion patterns in the video. In one example, samples are acquired over a five minute time span, giving approximately 9000 video sample frames 402, though larger or smaller sampling may be practiced. In estimating the direction of motion of the objects of interest at 104 appearing in each scene (i.e. each camera viewpoint) the optical flow of each sample frame 402 is determined by representing each space-time point by a four dimensional vector (x, y, v, θ) consisting of the location of the point 404 in the image plane 405 and the magnitude and direction of its optical flow 406. In one embodiment, clustering the training set images at 106 comprises discarding points having an optical flow magnitude above or below certain fixed thresholds, assuming them to be noise and, wherein the remaining points are randomly sub-sampled and clustered into optical flow map clusters 408, in one embodiment by using a self-tuning variant of spectral clustering which automatically selects the scale of analysis as well as the number of clusters. The clusters 408 so obtained represent the different directions of motion of vehicles appearing in the scene viewpoint, wherein each cluster 408 is then represented by a dominant direction 410 of motion of the points within it and by its location in the image plane.

Figure 5:
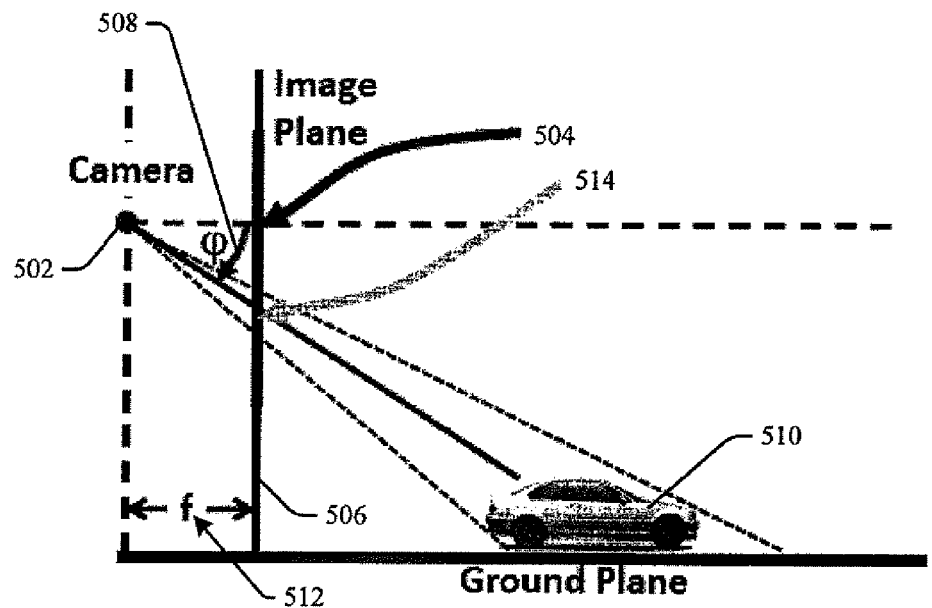
FIG. 5 is a graphical illustration of defining object poses as a function of scene geometry according to embodiments of the present invention.
Figure 6:
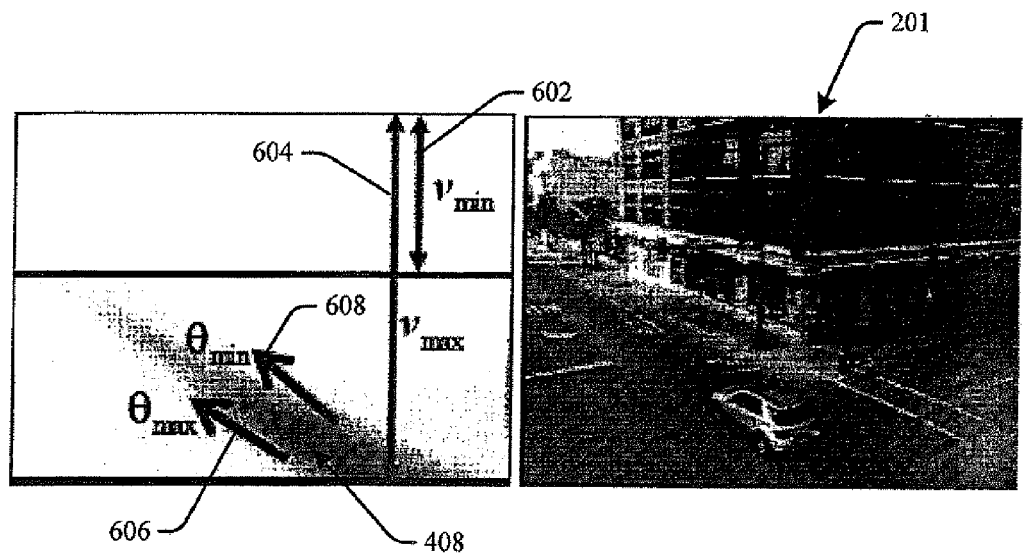
FIG. 6 is a graphical illustration of defining object poses as a function of scene geometry according to embodiments of the present invention.

The pose of each vehicle (object) is defined at 108 in terms of its azimuth angle θ and zenith angle φ with respect to the camera acquiring the view. Embodiments of the present invention may assume that there is no camera roll, as it can be easily rectified based on the horizon estimation. Thus, variations in the pose of the vehicles within a particular motion cluster of a camera viewpoint may be represented in terms of the ranges of the azimuth angles θ and zenith angles φ of the vehicles appearing within the cluster. FIGS. 5 and 6 provide graphical illustrations of defining object poses as a function of scene geometry according to embodiments of the present invention. We can define the optical center 502 of the camera with respect to the image plane 514 as $(u_c, v_c)$, and further $v_0$ 504 as the y-coordinate in the y direction of the horizon within the image plane 514. $v_{min}$ 602 and $v_{max}$ 604 denote the lower and upper extent, respectively, of a cluster in the y direction 506, wherein a range of zenith angles ø 508 of vehicles 510 appearing in that cluster can be defined as:

$$\phi_{max} = \tan^{-1}\left(\frac{v_{max} - v_c}{f}\right) + \tan^{-1}\left(\frac{v_c - v_0}{f}\right) \quad (1)$$

$$\phi_{min} = \tan^{-1}\left(\frac{v_{min} - v_c}{f}\right) + \tan^{-1}\left(\frac{v_c - v_0}{f}\right) \quad (2)$$

where f 512 is the focal length of the camera, assuming that the optical center of the camera $(u_c, v_c)$ 502 lies below the location of the horizon $(v_0)$ 504 in the image plane 514, though the equations are similar in case the reverse is true and the optical center $(u_c, v_c)$ 502 lies above the horizon location $(v_0)$ 504. Further, the equations (1) and (2) are valid even when the image plane 514 is not perpendicular to the horizon.

Maximum and minimum azimuth angles $(\theta_{max})$ 606 and $(\theta_{min})$ 608 of directions of motion of vehicles with respect to the camera are also determined based on the optical flow, and used to approximate the azimuth angles θ of vehicles within the motion cluster 408. Hence, the poses of the vehicles of appearing in a cluster $c_i$ 408 can be represented in terms of the range of their zenith angle φ with respect to the camera $(A_i=[\phi_{max},\phi_{min}])$ and the range of the direction of motion with respect to the camera $(Z_i=[\theta_{max},\theta_{min}])$.

At 110 a plurality of trained models or detectors 117 are built for recognizing vehicles in each of a variety of poses present in different camera viewpoints in the source domain training images 107 and as categorized by the two-level hierarchy established at 106 and discussed above, with each leaf node representing vehicles traveling in a specific direction as seen from the particular camera viewpoint. Some embodiments of the present invention build (or train) Deformable Parts Model (DPM)-based object detectors $DPM_s$ 117 for each corresponding leaf-node cluster $c_s$. However, embodiments may also utilize alternative object recognition systems, for example Viola-Jones object detectors (which may enable usage in real-time applications), and still others will be apparent to one skilled in the art of object tracking in computer vision applications.

In general, training on a larger amount of data leads to a better generalization, which is especially true if the learning procedure at 110 infers latent variables. For example, DPM-based object detectors 117 may treat the positions of the object parts as latent variables and employ a latent Support Vector Machine (SVM) to infer them from the data, wherein a large training set may improve the accuracy of a learned DPM model. Furthermore, where the source domain data contains a large number of camera viewpoints, each containing objects moving in multiple directions, the object detectors 117 are trained at 110 for a large number of possible poses: generally, the greater the number of possible poses used to train DPM-based object detectors 117, the greater the degree of view invariance that the detectors may handle.

Figure 7:
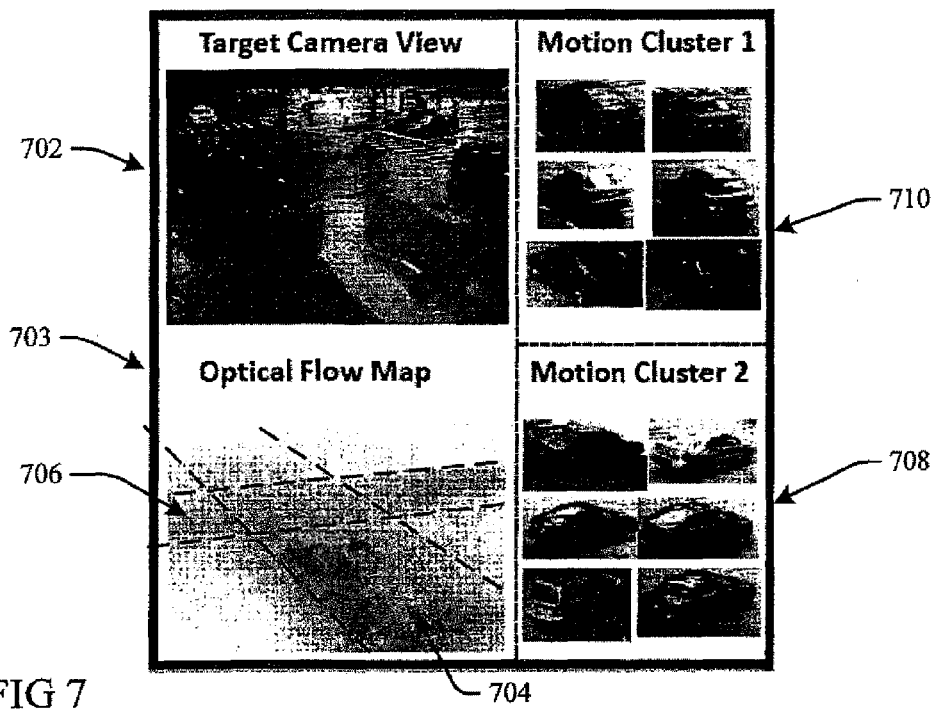
FIG. 7 is a diagrammatic illustration of a camera view scene according to embodiments of the present invention.

The trained detectors 117 are thus available for application to object images within a target domain video input 119 through use of the systems and processes described above with respect to elements 102, 104, 106 and 108, and wherein the target domain video input 119 may include video data captured from a new camera viewpoint previously unseen in the training source domain video data 101. FIG. 7 illustrates a camera view scene 702 of the target domain video input 119. Thus, one embodiment of the present invention at 118 estimates a position of the horizon in the target domain camera viewpoint scene. Motion patterns of the target domain objects appearing in the target domain camera viewpoint scene are determined at 122, through an optical flow or other process, etc. Target domain motion patterns are depicted in FIG. 7 as points 703 in the optical flow map 703 of the scene 702.

At 124 the target object image motion dimensions are determined based on the optical flow patterns computed from a short video sequence captured from the target camera viewpoint. At 126 the target object image poses are parameterized as a function of the target scene geometry, wherein a range of azimuth angles Ai and a range of zenith angles $Z_i$ of each of target video motion pattern clusters $c_i$ is determined. In the example in FIG. 7, two target video motion pattern clusters $c_i$ 704 and 706 are determined, wherein examples of the vehicle object images in the clusters are also illustrated: the "Motion Cluster 1" 710 images selected from the first motion pattern cluster $c_i$ 704, and the "Motion Cluster 2" 708 images selected from the second motion pattern cluster $c_i$ 706.

Figure 8:
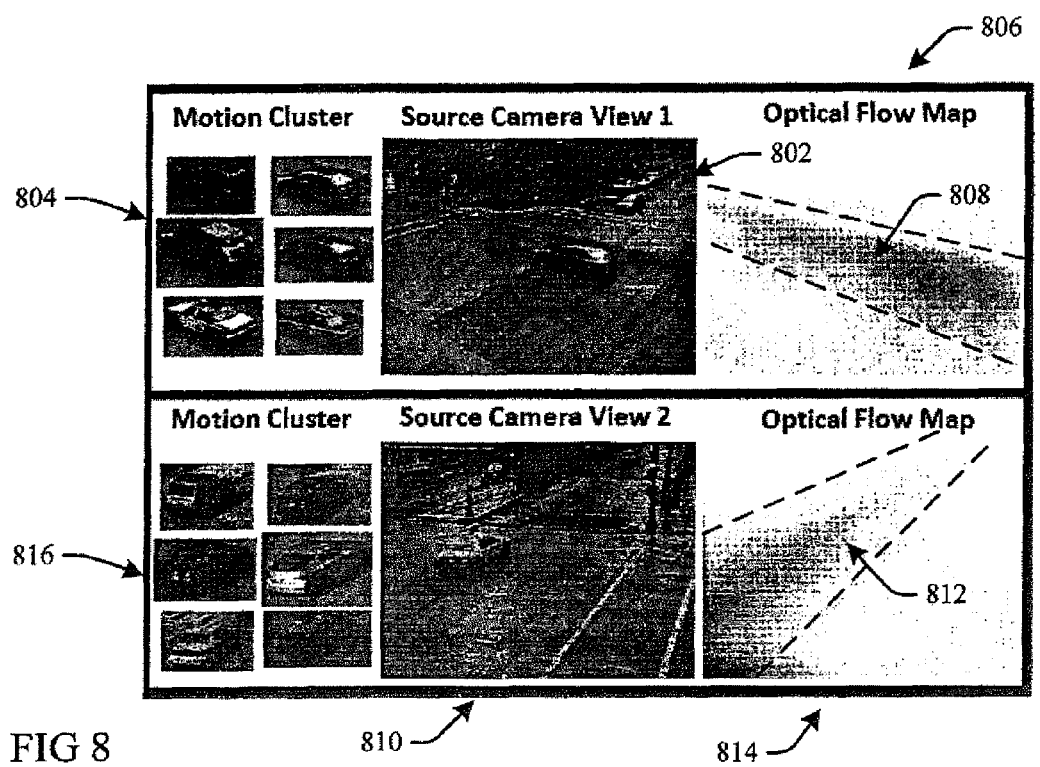
FIG. 8 is a diagrammatic illustration of a camera view scene according to embodiments of the present invention.

Hence, at 128 for each motion cluster $c_i$ in the target domain view, an object recognition detector/model is selected from the trained source view models 117 that best match the target object image pose zenith and azimuth angles and transferred to the target domain for use in detecting objects of interest (here, vehicles) in the target domain video camera viewpoint 119 acquired from their respective (matching) camera viewpoint. The models are thus selected as a function of the two-level hierarchy from source camera views: models trained from source domain clusters that are (i) from a source camera viewpoint having a matching scene geometry and (ii) comprising object images with matching motion directions within the camera viewpoint as determined by the clustered motion directions. FIG. 8 illustrates a camera viewpoint "Source Camera View 1" 802 from a source domain camera view of a first cluster 808 (mapped in an optical flow map 806) that matches the first target motion pattern cluster $c_i$ 704, and a camera viewpoint "Source Camera View 2" 810 from a source domain camera view of a second cluster 812 (mapped in an optical flow map 814) that matches the second target motion pattern cluster $c_i$ 706. Comparison of object image samples in FIGS. 7 and 8 reveals the similarities between poses of the respective objects of the matching target and source clusters: namely, see the similarity between the image sample sets 804 and 710 of the matching first clusters 704 and 808, and between the image sample sets 816 and 708 of the matching second clusters 706 and 812.

Thus, a distance measure for each motion cluster in the new (target) camera viewpoint pursuant to Equation (3) is used to identify and select the most appropriate of the models 117 for transfer from the source domain. For example, given a cluster $c_i$ in the target domain, embodiments of the present invention may choose a cluster $c_j$ in the source domain S and transfer its object recognition model $DPM_j$ for detecting vehicles in the source domain according to the following criterion in equation (3):

$$DPM_j = \operatorname{argmin}_{j \in S} w_a \|A_i - A_j\|_2 + w_z \|Z_i - Z_j\|_2 + w_s \left(1 - \frac{|S_j|}{|S_{max}|}\right) \quad (3)$$

where $w_a$, $w_z$ and $w_s$ are the relative weights assigned to the difference in the azimuth direction A, the difference in the motion direction Z and the relative size of the training dataset |S| corresponding to cluster $c_j$, and which may be chosen by cross-validation. |S| is the cardinality of the training set of cluster $c_j$ and ($|S_{max}|$) is the cardinality of the largest cluster: in our implementation $|S_{max}|$=20000, though other values may be specified or determined. The term ($w_s(1-|S_j|/|S_{max}|)$) in equation (3) may be considered a penalty term which helps to avoid selecting DPM models 117 trained on small amounts of data through a weighting penalty (the smaller the amount of training data, the larger the weighting penalty imposed).

Prior art methods typically build view-invariant object detectors that each model pluralities of possible viewpoints. This often requires restricting learned appearance models to a small number of fixed viewpoints, resulting in performance drops when presented with an unseen viewpoint. Learning a single model for a large number of viewpoints also considerably slows down detection speeds, as models for each viewpoint must be evaluated. In contrast, embodiments of the present invention instead learn view-specific object detectors for a large number of different viewpoints in the source domain, which when presented with an unseen viewpoint in a target domain, utilize scene geometry and vehicle motion patterns to identify closely related viewpoints in the source domain to select an appropriate detector based on the scene geometry and object motion patterns. Rather than build a global detector for use with all views in the target domain, the embodiments of the present invention transfer only detectors and information relevant to the identified target view into the target domain for use in object of interest detection, enabling accurate view-invariant object detection through utilization of faster and simpler view-specific object detectors.

Building a plurality of simple object detectors for a large number of different viewpoints in the source domain may densely span a desired modeling viewpoint space. Given a new viewpoint in the target domain, the embodiments exploit the viewpoint geometry to find closely related viewpoints from the source domain where objects of interest are expected to occur in poses similar to the target viewpoint. Dense model representation in a desired viewpoint space may also enable success in finding closely related viewpoints in the source domain.

Prior art processes are known that transfer knowledge between source and target domains within a supervised setting, generally under an underlying assumption of access to a large amount of out-of-domain (source domain) labeled training data and also a small amount of labeled in-domain (target domain) training data. Such supervised methods learn a complete model in the source domain and adapt it to the target domain by utilizing the available annotated target domain data, or learn a cross-domain mapping between the source and target domains. In contrast, embodiments of the present invention transfer knowledge learnt a priori on the selected viewpoints for detecting vehicles in the new target viewpoint. To match a new viewpoint to relevant viewpoints in the source domain, the embodiments of the present invention use distance metrics (for example, as per equation (3) above) which, in addition to vehicle pose, also take into account the generalizing ability of the detectors trained on the viewpoints in the source domain.

Prior art supervised learning approaches generally assume that the training (source) and the target data are drawn from the same distribution, resulting in a sharp drop in performance when the training and target data belong to different domains. In contrast, embodiments of the present invention transfer learning from the source to different but related target domains in a setting that is completely unsupervised and free of access to annotations or unlabeled data in the target domain, but instead where most appropriate object detection models are chosen from the source domain according to the scene geometry, layout and distance criterion (Equation (3)) given a target camera viewpoint.

In some examples, embodiments of the present invention outperform prior art detector models that utilize training data from the target domain. This may be a function of the size of the local training dataset, wherein a model trained on a slightly different viewpoint but with a larger amount of training data may outperform a model trained on the same viewpoint. Further, prior art global models may also be disadvantaged by grouping components based on an aspect ratio of the training images, rather than the more semantic camera-viewpoint/motion-cluster hierarchy criterion of embodiments of the present invention as described above.

Embodiments of the present invention may also offer increased speed over prior art view-invariant methods which attempt to learn appearance models of all viewpoints simultaneously; instead, the embodiments may select a two-component local DPM model from the trained models 117 corresponding to each motion cluster in a viewpoint. Where each camera viewpoint contains two motion clusters on average, the embodiment requires evaluation of only four DPM components, resulting in a speedup by a factor of two over prior art Global-DPM models which generally consist of eight-component models.

Figure 9:
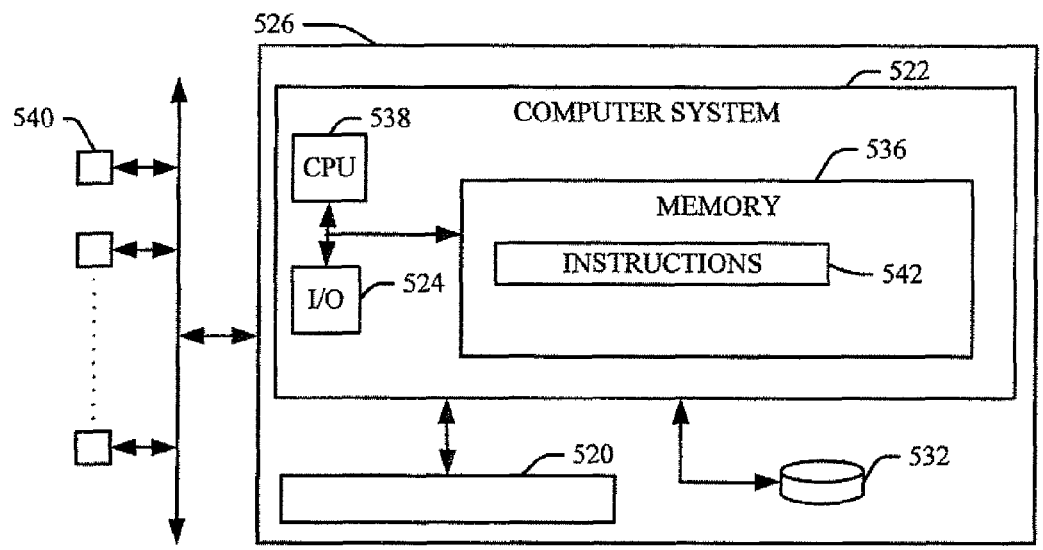
FIG. 9 is a block diagram illustration of a computerized implementation of an embodiment of the present invention.

Referring now to FIG. 9, an exemplary computerized implementation of an embodiment of the present invention includes computer or other programmable device 522 in communication with other devices 540 (for example, video cameras or video servers, or memory devices comprising a database of images, etc.). Instructions 542 reside within computer readable code in a computer readable memory 536, or in a computer readable storage system 532, another device 540 or other computer readable storage medium that is accessed through a computer network infrastructure 526 by a processing unit (CPU) 538. Thus, the instructions, when implemented by the processing unit (CPU) 538, cause the processing unit (CPU) 538 to learn and/or apply a plurality of view-specific object detectors to object images as a function of scene geometry and object motion patterns as described above with respect to FIGS. 1 through 8.

Figure 10:
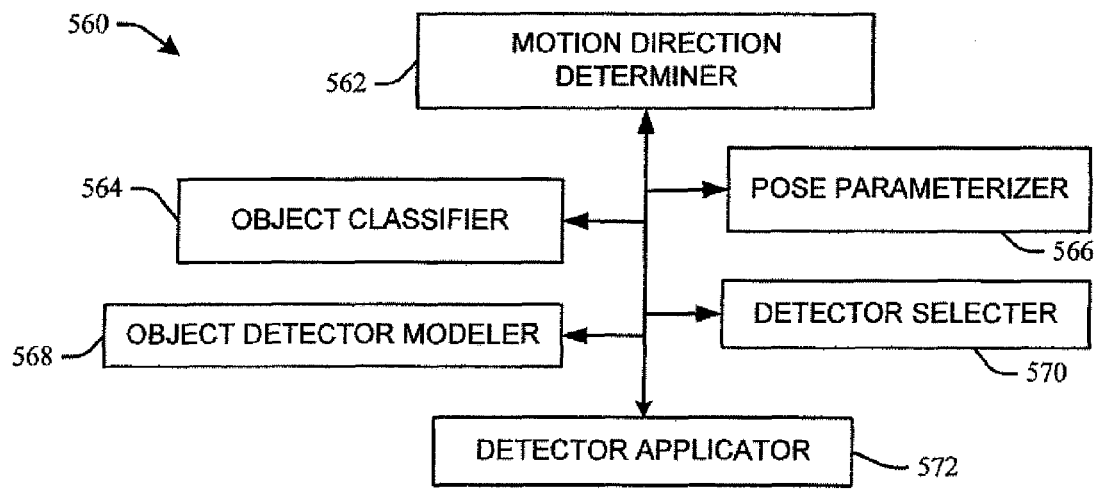
FIG. 10 is a block diagram illustration of an article according to the present invention that learns and/or applies a plurality of view-specific object detectors to object images as a function of scene geometry and object motion patterns.

FIG. 10 illustrates an article 560 (for example, a programmable device, system, etc.) according to the present invention that learns and/or applies a plurality of view-specific object detectors to object images as a function of scene geometry and object motion patterns as described above with respect to FIGS. 1 through 9. One or more of the components of the article 560 are tangible devices that perform specific functions, for example comprising the processing unit 538, the computer readable memory 536 and the computer readable storage medium 532 described above. Thus, as understood by reference to FIGS. 1-9 and the associated description material above, a Motion Direction Determiner 562 determines motion directions for object images extracted from video dataset inputs that have size and motion dimension values that meet an expected criterion of an object of interest, wherein the object images are collected from each of a plurality of different camera scene viewpoints.

An Object Classifier 564 categorizes object images into clusters as a function of similarities of their determined motion directions, and with respect to the different camera scene viewpoints used to acquire the object images in each of the clusters. A Pose Parameterizer 566 estimates zenith angles for poses of the object images in each of the clusters relative to a position of a horizon in the camera scene viewpoint from which the clustered object images are acquired, and azimuth angles of the poses as a function of a relation of the determined motion directions of the clustered object images to the camera scene viewpoint from which the clustered object images are acquired. The Pose Parameterizer 566 may also estimate a position of a horizon in a camera viewpoint scene of an object image.

An Object Detector Modeler 568 builds a plurality of detectors for recognizing objects in input video, one for each of the clusters of the object images, and associates each of the built detectors with the estimated zenith angles and azimuth angles of the poses of the cluster for which the detectors are built. A Detector Selector 570 selects built detectors that have associated cluster zenith and azimuth angles that best match target scene object image pose zenith and azimuth angles. A Detector Applicator 572 applies selected detectors to video data of the matching target domain clusters to recognize objects in the target domain video data that have the size and motion dimension values that meet the expected criterion of the object of interest.

Embodiments of the present invention may also perform process steps of the invention on a subscription, advertising, and/or fee basis. That is, a service provider could offer to learn detectors and/or find detected objects in video data as a function of semantic attributes including motion direction as described above with respect to FIGS. 1-6. Thus, the service provider can create, maintain, and support, etc., a computer infrastructure, such as the network computer system 522, network environment 526, and/or the article 560 (or parts thereof) that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computers/devices 522, from a computer-readable medium device 536, 520 or 540; (2) adding one or more computing devices to a computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for learning a view-specific object detector, the method comprising executing on a central processing unit the steps of:

determining a position of a horizon in a target camera viewpoint scene;

determining a motion direction for an object within an image of the target camera viewpoint scene;

determining a zenith angle for a pose of the object within the target scene relative to the estimated target camera viewpoint scene horizon;

determining an azimuth angle for a pose of the object within the target scene relative to the determined motion direction for the object within the image of the target camera viewpoint scene; and selecting one of a plurality of built detectors for recognizing objects in video data, as a function of the selected built detector having an associated cluster zenith angle that best matches the zenith angle determined for the pose of the object relative to cluster zenith angles that are associated with each of others of the plurality of built detectors, and an associated cluster azimuth angle that best matches the azimuth angle determined for the pose of the object relative to azimuth angles associated with each of the others of the plurality of built detectors.

2. The method of claim 1, further comprising:

determining motion directions for each of a plurality of object images that are extracted from a source training video dataset input and that each have size and motion dimension values that meet an expected criterion of an object of interest, wherein the object images are collected from each of a plurality of different camera scene viewpoints;

categorizing the plurality of object images into each of the plurality of clusters as a function of similarities of their determined motion directions, wherein the object images in each of the clusters are also acquired from one of the different camera scene viewpoints;

estimating zenith angles for poses of objects within the object images in each of the clusters relative to a position of a horizon in the camera scene viewpoint from which the clustered object images are acquired;

approximating azimuth angles for the poses of the object images in each of the clusters relative to the determined motion directions for the objects within the object images in each of the clusters;

building the plurality of built detectors for recognizing objects within input video, one for each of the clusters of the object images; and associating each of the built detectors with the estimated zenith angles and approximated azimuth angles of the poses of the clusters for which the detectors are built.

3. The method of claim 2, further comprising:

representing variations of the poses of the objects in each of the clusters with respect to a camera viewpoint from which the clustered objects are acquired, by a range of the zenith angles determined for the cluster objects from the minimum determined zenith angle to the maximum determined zenith angle; and representing variations of the determined directions of motion of each of the objects in each of the clusters with respect to the camera viewpoint from which the clustered objects are acquired, as a range of the azimuth angles determined for the cluster objects from the minimum determined azimuth angle to the maximum determined azimuth angle.

4. The method of claim 3, wherein the clusters are optical flow map clusters, and wherein the method further comprises:

estimating a direction of motion of objects appearing in each scene for each respective camera viewpoint through an optical flow process;

representing each space-time point in the estimated optical flow directions of motion of the objects appearing for each respective camera viewpoint by a four-dimensional vector, the vector comprising a location of the each space-time point in an image plane, a magnitude and a direction of its optical flow; and categorizing the plurality of object images into the plurality of optical flow map clusters as a function of the similarities of their determined motion directions by:

discarding the space-time points that have an optical flow magnitude that is above or below certain respective fixed thresholds as noise;

after the discarding the noise points, randomly sub-sampling and clustering a remainder of the space-time points into the optical flow map clusters by using a self-tuning variant of spectral clustering that automatically selects a scale of analysis and the total number of the clusters; and representing different values of the directions of motion of the objects appearing in the scene viewpoint of each optical flow map cluster by the dominant direction of motion of the points within each optical flow map cluster and by the location of the cluster in the image plane.

5. The method of claim 4, further comprising:

estimating the position of the horizon in each of the clustered training camera views and the target camera view by utilizing structures in images of the camera scene viewpoint that have an inherent geometric relationship to an image horizon inferred from the real-world, three-dimensional geometry of the structures in the camera scene viewpoint images.

6. The method of claim 5, wherein the step of estimating the position of the horizon in at least one of the clustered camera views and the target camera view by utilizing the structures in images of the camera scene viewpoint that have an inherent geometric relationship to the image horizon inferred from the real-world, three-dimensional geometry of the structures in the camera scene viewpoint images comprises:

identifying a plurality of structures in the images of the camera scene viewpoint through geometric parsing that are generally parallel to each other in the real-world, three-dimensional geometry of the structures in the camera scene viewpoint images;

using the plurality of structures to define multiple sets of parallel lines in the camera scene viewpoint images that are each aligned with structures such as buildings, roads etc. wherein each set of parallel lines intersects at a vanishing point; and estimating the horizon line as a line passing through the vanishing points of at least two sets of parallel lines.

7. The method of claim 6, wherein the step of building the plurality of detectors for recognizing objects in input video comprises:

building Deformable Parts Model (DPM)-based object detectors that treat positions of parts of the objects as latent variables; and employing a latent Support Vector Machine (SVM) to infer the positions of the parts of the objects from image data in the input video.

8. A system comprising:

a central processing unit;

a computer readable memory in circuit communication with the central processing unit; and a computer-readable storage medium in circuit communication with the central processing unit; and wherein the central processing unit executes program instructions stored on the computer-readable storage medium via the computer readable memory and thereby:

determines a position of a horizon in a target camera viewpoint scene;

determines a motion direction for an object within an image of the target camera viewpoint scene;

determines a zenith angle for a pose of the object within the target scene relative to the estimated target camera viewpoint scene horizon;

determines an azimuth angle for a pose of the object within the target scene relative to the determined motion direction for the object within the image of the target camera viewpoint scene; and selects one of a plurality of built detectors for recognizing objects in video data, as a function of the selected built detector having an associated cluster zenith angle that best matches the zenith angle determined for the pose of the object relative to cluster zenith angles that are associated with each of others of the plurality of built detectors, and an associated cluster azimuth angle that best matches the azimuth angle determined for the pose of the object relative to azimuth angles associated with each of the others of the plurality of built detectors.

9. The system of claim 8, wherein the central processing unit executes the program instructions stored on the computer-readable storage medium via the computer readable memory and thereby further:

determines motion directions for each of a plurality of object images that are extracted from a source training video dataset input and that each have size and motion dimension values that meet an expected criterion of an object of interest, wherein the object images are collected from each of a plurality of different camera scene viewpoints;

categorizes the plurality of object images into each of the plurality of clusters as a function of similarities of their determined motion directions, wherein the object images in each of the clusters are also acquired from one of the different camera scene viewpoints;

estimates zenith angles for poses of objects within the object images in each of the clusters relative to a position of a horizon in the camera scene viewpoint from which the clustered object images are acquired;

approximates azimuth angles for the poses of the object images in each of the clusters relative to the determined motion directions for the objects within the object images in each of the clusters;

builds the plurality of built detectors for recognizing objects within input video, one for each of the clusters of the object images; and associates each of the built detectors with the estimated zenith angles and approximated azimuth angles of the poses of the clusters for which the detectors are built.

10. The system of claim 9, wherein the central processing unit executes the program instructions stored on the computer-readable storage medium via the computer readable memory and thereby further:

represents variations of the poses of the objects in each of the clusters with respect to a camera viewpoint from which the clustered objects are acquired, by a range of the zenith angles determined for the cluster objects from the minimum determined zenith angle to the maximum determined zenith angle; and represents variations of the determined directions of motion of each of the objects in each of the clusters with respect to the camera viewpoint from which the clustered objects are acquired, as a range of the azimuth angles determined for the cluster objects from the minimum determined azimuth angle to the maximum determined azimuth angle.

11. The system of claim 10, wherein the clusters are optical flow map clusters, and wherein the central processing unit executes the program instructions stored on the computer-readable storage medium via the computer readable memory and thereby further:

estimates a direction of motion of objects appearing in each scene for each respective camera viewpoint through an optical flow process;

represents each space-time point in the estimated optical flow directions of motion of the objects appearing for each respective camera viewpoint by a four-dimensional vector, the vector comprising a location of the each space-time point in an image plane, a magnitude and a direction of its optical flow; and categorizes the plurality of object images into the plurality of optical flow map clusters as a function of the similarities of their determined motion directions by:

discarding the space-time points that have an optical flow magnitude that is above or below certain respective fixed thresholds as noise;

after the discarding the noise points, randomly sub-sampling and clustering a remainder of the space-time points into the optical flow map clusters by using a self-tuning variant of spectral clustering that automatically selects a scale of analysis and the total number of the clusters; and representing different values of the directions of motion of the objects appearing in the scene viewpoint of each optical flow map cluster by the dominant direction of motion of the points within each optical flow map cluster and by the location of the cluster in the image plane.

12. The system of claim 11, wherein the central processing unit executes the program instructions stored on the computer-readable storage medium via the computer readable memory and thereby further:

estimates the position of the horizon in each of the clustered training camera views and the target camera view by utilizing structures in images of the camera scene viewpoint that have an inherent geometric relationship to an image horizon inferred from the real-world, three-dimensional geometry of the structures in the camera scene viewpoint images.

13. The system of claim 12, wherein the central processing unit executes the program instructions stored on the computer-readable storage medium via the computer readable memory and thereby further estimates the position of the horizon in at least one of the clustered camera views and the target camera view by utilizing the structures in images of the camera scene viewpoint that have an inherent geometric relationship to the image horizon inferred from the real-world, three-dimensional geometry of the structures in the camera scene viewpoint images by:

identifying a plurality of structures in the images of the camera scene viewpoint through geometric parsing via the processing unit that are generally parallel to each other in the real-world, three-dimensional geometry of the structures in the camera scene viewpoint images;

using the plurality of structures to define multiple sets of parallel lines in the camera scene viewpoint images that are each aligned with structures such as buildings, roads etc. wherein each set of parallel lines intersects at a vanishing point; and estimating the horizon line as a line passing through the vanishing points of at least two sets of parallel lines.

14. The system of claim 13, wherein the central processing unit executes the program instructions stored on the computer-readable storage medium via the computer readable memory and thereby further builds the plurality of detectors for recognizing objects in input video by:
- building Deformable Parts Model (DPM)-based object detectors that treat positions of parts of the objects as latent variables; and
- employing a latent Support Vector Machine (SVM) to infer the positions of the parts of the objects from image data in the input video.

15. An article of manufacture, comprising:
a computer readable hardware storage device having computer readable program code embodied therewith, the computer readable program code comprising instructions for execution by a processor that cause the processor to:
- determine a position of a horizon in a target camera viewpoint scene;
- determine a motion direction for an object within an image of the target camera viewpoint scene;
- determine a zenith angle for a pose of the object within the target scene relative to the estimated target camera viewpoint scene horizon;
- determine an azimuth angle for a pose of the object within the target scene relative to the determined motion direction for the object within the image of the target camera viewpoint scene; and
- select one of a plurality of built detectors for recognizing objects in video data, as a function of the selected built detector having an associated cluster zenith angle that best matches the zenith angle determined for the pose of the object relative to cluster zenith angles that are associated with each of others of the plurality of built detectors, and an associated cluster azimuth angle that best matches the azimuth angle determined for the pose of the object relative to azimuth angles associated with each of the others of the plurality of built detectors.

16. The article of manufacture of claim 15, wherein the computer readable program code instructions for execution by the processor further cause the processor to:
- determine motion directions for each of a plurality of object images that are extracted from a source training video dataset input and that each have size and motion dimension values that meet an expected criterion of an object of interest, wherein the object images are collected from each of a plurality of different camera scene viewpoints;
- categorize the plurality of object images into each of the plurality of clusters as a function of similarities of their determined motion directions, wherein the object images in each of the clusters are also acquired from one of the different camera scene viewpoints;
- estimate zenith angles for poses of objects within the object images in each of the clusters relative to a position of a horizon in the camera scene viewpoint from which the clustered object images are acquired;
- approximate azimuth angles for the poses of the object images in each of the clusters relative to the determined motion directions for the objects within the object images in each of the clusters;
- build the plurality of built detectors for recognizing objects within input video, one for each of the clusters of the object images; and
- associate each of the built detectors with the estimated zenith angles and approximated azimuth angles of the poses of the clusters for which the detectors are built.

17. The article of manufacture of claim 16, wherein the computer readable program code instructions for execution by the processor further cause the processor to:
- represent variations of the poses of the objects in each of the clusters with respect to a camera viewpoint from which the clustered objects are acquired, by a range of the zenith angles determined for the cluster objects from the minimum determined zenith angle to the maximum determined zenith angle; and
- represent variations of the determined directions of motion of each of the objects in each of the clusters with respect to the camera viewpoint from which the clustered objects are acquired, as a range of the azimuth angles determined for the cluster objects from the minimum determined azimuth angle to the maximum determined azimuth angle.

18. The article of manufacture of claim 17, wherein the clusters are optical flow map clusters, and wherein the computer readable program code instructions for execution by the processor further cause the processor to:
- estimate a direction of motion of objects appearing in each scene for each respective camera viewpoint through an optical flow process;
- represent each space-time point in the estimated optical flow directions of motion of the objects appearing for each respective camera viewpoint by a four-dimensional vector, the vector comprising a location of the each space-time point in an image plane, a magnitude and a direction of its optical flow; and
- categorize the plurality of object images into the plurality of optical flow map clusters as a function of the similarities of their determined motion directions by:
- discarding the space-time points that have an optical flow magnitude that is above or below certain respective fixed thresholds as noise;
- after the discarding the noise points, randomly sub-sampling and clustering a remainder of the space-time points into the optical flow map clusters by using a self-tuning variant of spectral clustering that automatically selects a scale of analysis and the total number of the clusters; and
- representing different values of the directions of motion of the objects appearing in the scene viewpoint of each optical flow map cluster by the dominant direction of motion of the points within each optical flow map cluster and by the location of the cluster in the image plane.

19. The article of manufacture of claim 18, wherein the computer readable program code instructions for execution by the processor further cause the processor to:
- estimate the position of the horizon in each of the clustered training camera views and the target camera view by utilizing structures in images of the camera scene viewpoint that have an inherent geometric relationship to an image horizon inferred from the real-world, three-dimensional geometry of the structures in the camera scene viewpoint images.

20. The article of manufacture of claim 19, wherein the computer readable program code instructions for execution by the processor further cause the processor to estimate the position of the horizon in at least one of the clustered camera views and the target camera view by utilizing the structures in images of the camera scene viewpoint that have an inherent geometric relationship to the image horizon inferred from the real-world, three-dimensional geometry of the structures in the camera scene viewpoint images by:
- identifying a plurality of structures in the images of the camera scene viewpoint through geometric parsing via the processing unit that are generally parallel to each other in the real-world, three-dimensional geometry of the structures in the camera scene viewpoint images;

using the plurality of structures to define multiple sets of parallel lines in the camera scene viewpoint images that are each aligned with structures such as buildings, roads etc. wherein each set of parallel lines intersects at a vanishing point; and estimating the horizon line as a line passing through the vanishing points of at least two sets of parallel lines.

* * * * *